No. 775,419. PATENTED NOV. 22, 1904.
L. GOLDBERGER.
COMBINED BELT CUTTER, PUNCH, AND LINK CLENCHER.
APPLICATION FILED APR. 15, 1904.
NO MODEL.

Witnesses.
Fred. E. Dorr.
J. E. Maloney.

Inventor:
Leopold Goldberger
by Teshemacher
Atty

No. 775,419.

Patented November 22, 1904.

UNITED STATES PATENT OFFICE.

LEOPOLD GOLDBERGER, OF BOSTON, MASSACHUSETTS, ASSIGNOR OF ONE-HALF TO MAX SHOOLMAN, OF BOSTON, MASSACHUSETTS.

COMBINED BELT-CUTTER, PUNCH, AND LINK-CLENCHER.

SPECIFICATION forming part of Letters Patent No. 775,419, dated November 22, 1904.

Application filed April 15, 1904. Serial No. 203,366. (No model.)

*To all whom it may concern:*

Be it known that I, LEOPOLD GOLDBERGER, a citizen of Hungary, residing at Boston, in the county of Suffolk and State of Massachusetts, have invented a Combined Belt-Cutter, Punch, and Link-Clencher, of which the following is a specification.

My invention has for its object to provide a simple, reliable, and convenient implement by means of which the two ends of a round driving-belt may be simultaneously cut off, punched to form holes at a uniform distance from its ends to receive the wire connecting-link, and said link after being passed through said holes properly clenched or flattened down upon the belt to complete the operation of connecting its ends together.

With these ends in view my invention consists in certain novel features of construction and combinations of parts, as hereinafter fully described, and pointed out in the claims.

Figure 1:
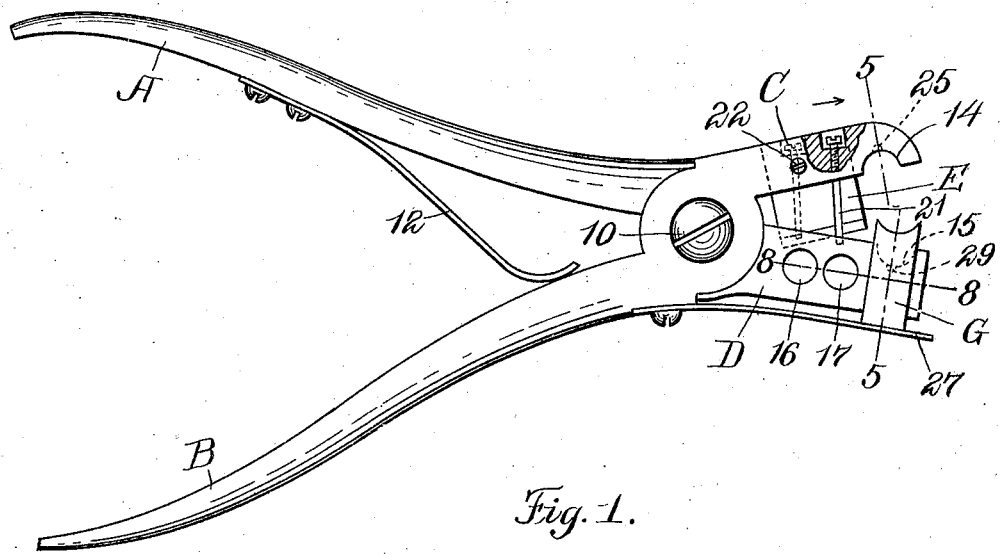
Figure 2:
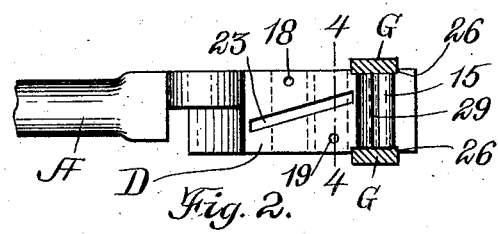
Figure 3:
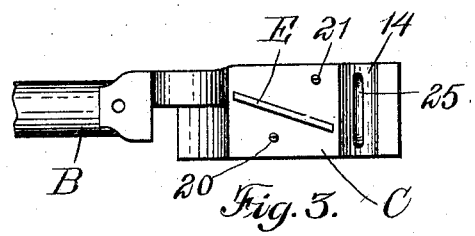
Figure 4:
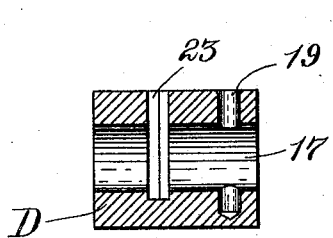
Figure 5:
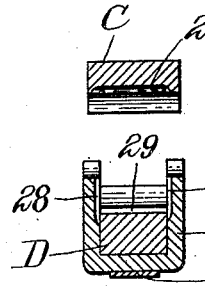
Figures 6, 7:
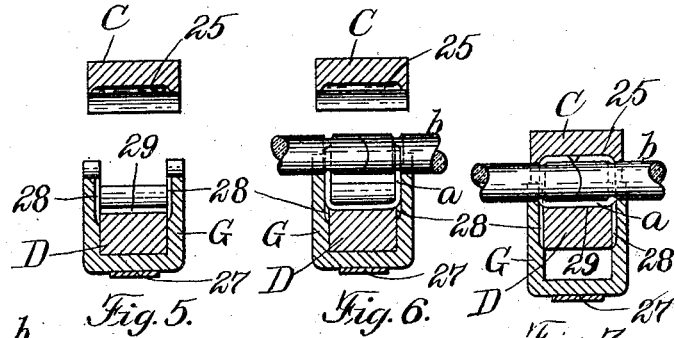
Figures 8, 9:
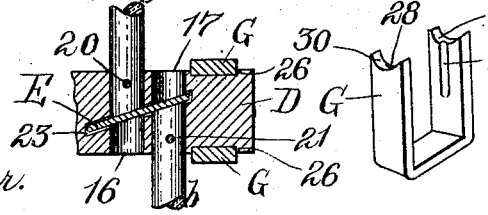

In the accompanying drawings, Figure 1 is a side elevation of my improved implement. Fig. 2 is a plan of the lower jaw of the same. Fig. 3 is a plan of the inner side of the upper jaw. Fig. 4 is an enlarged vertical section on the line 4 4 of Fig. 2. Fig. 5 is a vertical section on the line 5 5 of Fig. 1. Fig. 6 is a similar section showing the belt with the link in the position for clenching. Fig. 7 is a similar section showing the jaws closed upon the ends of the belt and the link clenched down thereon. Fig. 8 is a horizontal section on the line 8 8 of Fig. 1, showing the two ends of a belt within the transverse openings of the lower jaw and the cutter and punches passed through the belt. Fig. 9 is a view of the movable link-holder.

In the said drawings, A B represent a pair of levers or handles pivoted together at 10 and having coöperating jaws C D, which are normally kept apart, as shown in Fig. 1, by a flat spring 12, secured to one of said handles and bearing against the other. The jaws C D are provided at their outer ends with semicircular recesses 14 15, and extending transversely through the lower jaw D are two circular openings 16 17 for the reception of the two ends of a round driving-belt $b$, which are to be inserted on opposite sides of the jaw, as shown in Fig. 8, and pushed through, or nearly through, said openings. In the upper face of the jaws D are formed two guide-openings 18 19, which intersect the belt-openings 16 17 at right angles, and projecting from the upper or clenching jaw C are two solid punches 20 21, which are adapted to register with and pass through the guide-holes 18 19 and diametrically through the ends of the belt lying within the openings 16 17, the ends of the punches being chisel-pointed or otherwise suitably sharpened, so as to pass easily through the belt to form the holes for the reception of the wire connecting-link $a$, by which the ends of the belt are secured together. These punches are preferably screwed into the jaw C to render them easily removable if broken or injured.

E is a knife-blade or cutter removably secured within a slot in the jaw C by a screw 22, said cutter being centrally arranged between the punches and diagonally with respect to the axes of the opening 16 17 and being adapted to pass through a corresponding diagonal slot 23 in the jaw D, which extends down below the bottoms of the openings 16 17, intersecting the same, as shown. With this arrangement the two ends of the belt are cut off on a bevel simultaneously with the punching of the holes for the reception of the ends of the wire connecting-link, each hole being punched at the same distance from the beveled end of the belt, and when said ends are fitted together the distance between the holes will be exactly equal to that between the two prongs of the staple-shaped link $a$, by which the ends of the belt are secured together. If preferred, the cutter-blade E and its guide-slot 23 instead of being placed diagonally, as shown, may be arranged parallel with the sides of the jaws, so as to intersect the belt-openings at a right angle, in which case the ends of the belt will be cut off square instead of on a bevel, as previously described.

The recess 14 at the end of the clenching-jaw C is provided with a groove 25, Figs. 3, 5, and 6, the length of which is less than the width of the jaw, and the ends of this groove are dished or concaved to receive and turn the prongs of the link *a* toward each other in the operation of clenching them as the jaws are closed together upon the belt, as will be hereinafter described. The width of the outer end of the upper jaw is a little greater than that of the lower jaw, thus enabling the groove 25 to be made of the same or a little greater length than the distance between the prongs of the fastening-link without extending to the edges of the jaw.

On the completion of the cutting and punching operation the jaws are opened and the ends of the belt removed from the openings 16 17, when they are ready to be fitted together and connected by the ordinary wire fastening-link *a*, which is inserted, prongs uppermost, within the link-holder G, which consists of a yoke adapted to slide in vertical grooves 26 in the opposite sides of the jaw D and yieldingly held in the position shown in Fig. 1 by a stiff flat spring 27 bearing against its under side. On the inner face of each of the side pieces of the link-holder G is a semicircular guide-groove 28, which serves to hold the link in position, with its bottom resting on the bottom of the recess 15 of the jaw D in a transverse groove 29, made to receive it. When in this position, the cut ends of the belt are accurately fitted together and placed in semicircular recesses 30, formed in the upper ends of the link-holder G, with the link-prongs projecting into the holes punched in the belt, as shown in Fig. 6. The jaws are then closed upon the belt, when the link-prongs will be forced through the holes in its ends and brought into contact with the inwardly curved or inclined ends of the groove 25 in the jaw C, by which they are forced toward each other as they are pressed down and clenched upon the belt, thus completing the operation and making a perfect joint, the pressure of the upper jaw depressing the holder G against the resistance of the spring 27, thus allowing the belt to pass into the recess 15 of the lower jaw and be tightly gripped between the recesses of the upper and lower jaws. On releasing the handles the jaws are opened by the spring 12, and the spring 27 then acts to restore the holder G to its normal position, when the implement will be ready for operating on another belt.

What I claim as my invention, and desire to secure by Letters Patent, is—

1. A combined belt-cutter, punch, and link-clencher, comprising a pair of pivoted handles provided with coöperating jaws, the lower jaw having a pair of parallel openings extending transversely therethrough for the reception of the two ends of a round belt, two punches carried by the upper jaw and adapted to pass through guide-openings in the upper face of the lower jaw and intersect the belt-openings at right angles to their axes, a belt-cutter or knife carried by the upper jaw and adapted to pass through a vertical slot in the lower jaw intersecting both of its belt-openings and arranged centrally between the guide-openings for the punches, whereby both ends of the belt are simultaneously cut off at equal distances from the holes simultaneously formed by the punches, and means carried by the outer ends of the jaws for holding the fastening-link, yieldingly supporting the ends of the belt, and forcing the ends of the link toward each other as they are clenched upon the belt by the closing of the jaws.

2. In a tool of the character described, the combination of a pair of pivoted jaws having handles, and provided at their outer ends with semicircular recesses for grasping the belt, each recess having a groove at its bottom, the upper jaw carrying two punches and a vertical cutter-blade arranged centrally between them, and the lower jaw having two parallel transverse openings for the reception of the ends of the belt and a slot and guide-holes intersecting said transverse openings for the passage of the said cutter and punches, and a vertically-sliding spring-pressed yoke or holder mounted on the end of the lower jaw, and adapted to hold the link with its prongs uppermost, and support the belt while the link is being clenched by the closing of the jaws.

3. In a tool of the character described, a link holding and clenching device consisting of a pair of pivoted jaws, and a yielding spring-pressed yoke or holder embracing the outer end of the lower jaw and sliding vertically thereon and provided with grooves in its sides for holding the fastening-link, the lower jaw having a circular recess at its outer end provided at its bottom with a groove for the reception of the bottom of the link, and the upper jaw having a transverse groove provided with inwardly curved or inclined ends adapted to force the ends of the link toward each other as they are clenched down upon the belt.

4. A combined belt-cutter, punch, and link-clencher, comprising a pair of spring-pressed pivoted handles provided with coöperating jaws, each provided at its outer end with a semicircular recess, the lower jaw having two horizontal apertures extending transversely therethrough for the reception of the two ends of a round belt, two vertical openings in its upper face intersecting said horizontal apertures at right angles to their axes, and a vertical slot centrally located between said vertical openings and intersecting the said transverse belt-openings, two punches carried by the upper jaw and adapted to pass through the vertical openings of the lower jaw, and a cutter centrally located between said punches, and adapted to pass through the vertical slot of the lower jaw, and a yielding spring-pressed link-holder embracing the outer end of the lower jaw and having its upper ends concaved to fit the belt and provided with guide-grooves in its sides for holding a wire fastening-link with its prongs uppermost, said prongs being adapted to be forced toward each other and clenched by contact with the upper jaw, the latter having in its semicircular recess, a groove provided with inwardly curved or inclined ends, substantially as described.

Witness my hand this 9th day of April, A. D. 1904.

LEOPOLD GOLDBERGER.

In presence of—
P. E. TESCHEMACHER,
SAM. WEIMAN.